(12) United States Patent
Furukawa et al.

(10) Patent No.: US 7,039,825 B2
(45) Date of Patent: May 2, 2006

(54) CLOCK REPRODUCING METHOD AND RECEIVING CLOCK PRODUCING APPARATUS ALLOWING FOR ABSORPTION OF TRANSMISSION CHANNEL JITTER

(75) Inventors: Jun Furukawa, Tokyo (JP); Yoshiaki Nozawa, Tokyo (JP); Yasuhiro Arasawa, Miyagi (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 10/164,311

(22) Filed: Jun. 7, 2002

(65) Prior Publication Data

US 2003/0005348 A1 Jan. 2, 2003

(30) Foreign Application Priority Data

Jun. 8, 2001 (JP) ............................. 2001-173523

(51) Int. Cl.
*G06F 1/04* (2006.01)
(52) U.S. Cl. ....................... 713/600; 713/500
(58) Field of Classification Search ................ 713/500, 713/600; 331/17; 375/372, 376
See application file for complete search history.

(56) References Cited

U.S. PATENT DOCUMENTS

| | | | | |
|---|---|---|---|---|
| 5,263,057 A | * | 11/1993 | Nawrocki et al. | .......... 375/372 |
| 5,396,492 A | * | 3/1995 | Lien | ............................. 370/412 |
| 5,486,784 A | * | 1/1996 | Eriksson | ...................... 327/165 |
| 5,923,220 A | * | 7/1999 | Honma | ......................... 331/17 |
| 6,219,396 B1 | * | 4/2001 | Owada | ........................ 375/372 |
| 6,351,164 B1 | * | 2/2002 | Yoshie | ........................ 327/156 |
| 6,380,809 B1 | * | 4/2002 | Camp, Jr. | ..................... 331/17 |
| 6,396,891 B1 | * | 5/2002 | Masafumi et al. | .......... 375/376 |
| 6,675,314 B1 | * | 1/2004 | Yamada et al. | ............. 713/600 |

FOREIGN PATENT DOCUMENTS

| | | | |
|---|---|---|---|
| JP | 1-183934 | * | 7/1989 |
| JP | 7-143089 | | 6/1995 |
| JP | 8-37521 | | 2/1996 |
| JP | 10-27115 | | 10/1998 |
| WO | WO 00/52888 | | 8/2000 |

OTHER PUBLICATIONS

Hirotoshi Yamada, Kentaro Tanaka, Koichi Nakashima, Takeshi Mio and Hiroshi Kawawata; "A Study on Adaptive Clock Method for AAL Type 1;" Information Technology R&D Center, Mitsubishi Electric Corp., p. 409.

* cited by examiner

*Primary Examiner*—Chun Cao
(74) *Attorney, Agent, or Firm*—Foley & Lardner LLP

(57) ABSTRACT

In a receiving clock reproducing method, an estimated value of delay time fluctuation of a received signal is estimated at intervals defined by transmitting clock included in the received signal. To estimate the estimated value, an oscillator counter counts pulses of a reference clock supplied from an independent oscillator while a reading counter counts pulses of the receiving clock. The estimated value is used to control a voltage controlled oscillator for producing the receiving clock.

8 Claims, 7 Drawing Sheets

CLOCK REPRODUCING METHOD AND RECEIVING CLOCK PRODUCING APPARATUS ALLOWING FOR ABSORPTION OF TRANSMISSION CHANNEL JITTER

BACKGROUND OF THE INVENTION

This invention relates to a clock reproducing method, in particular, to a receiving clock producing method which enables real time transmission of a moving picture signal on a network, such as a packet switching network or an asynchronous transfer mode (ATM) network, by reducing or absorbing jitter on a received data signal.

In the network such as the packet switching network or the ATM network, the jitter is apt to occur on a transmitted signal transmitted through a transmission channel of the network. In addition, the network does not guarantee to establish network synchronization between a transmitting side and a receiving side. Accordingly, the network has a problem that delay time of the received data signal has fluctuation. That is, the received data signal has the jitter given by the transmission channel. To reduce or absorb the jitter on the received data signal, a jitter-absorbing buffer is necessary at the receiving side.

Herein, the term of "jitter" represents a state that pulses of the received data signal deviate forward or backward from normal time positions. That is, the pulses of the received data signal has phase variation or fluctuation in this state. Accordingly, the state may be considered that undesirable phase shift modulation is provided to the transmitted signal. The undesirable phase shift modulation appears as jitter noise when the received data signal is demodulated. Thus, the jitter deteriorates transmission quality of the network.

The jitter is roughly classified into two types. One type is transmission channel jitter caused by transmitting the transmitted signal through the transmission channel. The other is a stuff jitter brought by pulse staffing synchronization for multiple synchronization. This invention aims to reduce or absorb the transmission channel jitter.

Generally, a receiving buffer different from the jitter-absorbing buffer is provided in the receiving side. To prevent the receiving buffer from overflowing, a reading clock (or a receiving clock) must be synchronized with a writing clock (or a transmitting clock). Thus, a related receiving clock producing apparatus adopts an adaptive clock reproducing method that its notion is defined by ITU-T (International Telecommunication Union-Telecommunication Standardization Sector) recommendation I.363.1. According to an existing adaptive clock reproducing method, the amount of data staying in the receiving buffer is monitored and the receiving clock is controlled so that the amount of the data staying in the receiving buffer is equal to a predetermined volume.

The existing adaptive clock reproducing method does not consider the transmission channel jitter. Thus, it is hard to reduce or absorb considerably the transmission channel jitter on the received data signal by the use of the receiving buffer. Therefore, the related receiving clock producing apparatus provides the jitter absorbing buffer mentioned above. That is, the related clock reproducing apparatus has two buffers and is complex in structure.

SUMMARY OF THE INVENTION

It is therefore an object of this invention to provide a clock reproducing method capable of absorbing transmission channel jitter without a jitter-absorbing buffer.

It is another object of this invention to provide a receiving clock producing apparatus capable of reducing transmission channel jitter included in a received data signal without a jitter-absorbing buffer.

Other object of this invention will become clear as the description proceeds.

According to an aspect of this invention, an independent clock is provided to a recieving side to produce a reference clock. An oscillator counter counts pulses of the reference clock to produce a standard time. Reproduction of a receiving clock is made by control including calculation of delay time variation caused by jitter.

According to still another aspect of this invention, a receiving clock reproducing apparatus reproduces a receiving clock to read data from a buffer memory. The data read from the buffer memory is taken from a received signal and written in the buffer memory in synchronization with a transmitting clock included in the received signal. The receiving clock reproducing apparatus comprises a writing counter for counting pulses of the transmitting clock to produce a counted writing value. A voltage controlled oscillator produces the receiving clock according to an oscillator control signal. A reading counter is connected to the voltage controlled oscillator and counts pulses of the receiving clock to produce a counted reading value. An independent oscillator produces a reference clock. An oscillator counter is connected to the independent oscillator and counts pulses of the reference clock to produce a counted reference value. A controller is connected to the writing counter, the reading counter and the oscillator counter to produces the oscillator control signal on the basis of the counted writing value, the counted reading value and the counted reference value.

According to further still another aspect of this invention, a receiving clock reproducing apparatus reproduces a receiving clock to read MPEG data from a buffer memory. The MPEG data is transmitted via a packet switching network together with a transmitting clock in the form of packets and written in the buffer memory in synchronous with the transmitting clock. The receiving clock reproducing apparatus comprises a writing counter which counts pulses of the transmitting clock to produce a counted writing value. A voltage controlled crystal oscillator starts to produce the receiving clock after an amount of the MPEG data stored in the buffer memory reaches a predetermined value. A reading counter counts pulses of the receiving clock to produce a counted reading value. An oscillator counter counts pulses of a reference clock supplied from an independent oscillator provided at a receiving side of the packet switching network to produce a counted reference value. A calculating portion produces a digital voltage control signal used to control the voltage controlled crystal oscillator on the basis of the counted writing value, the counted reading value and the counted reference value. A digital-to-analog converter converts the digital voltage control signal into an analog voltage control signal to supply the analog voltage control signal to the voltage controlled crystal oscillator.

DESCRIPTION OF THE PREFERRED EMBODIMENTS

Figure 1:
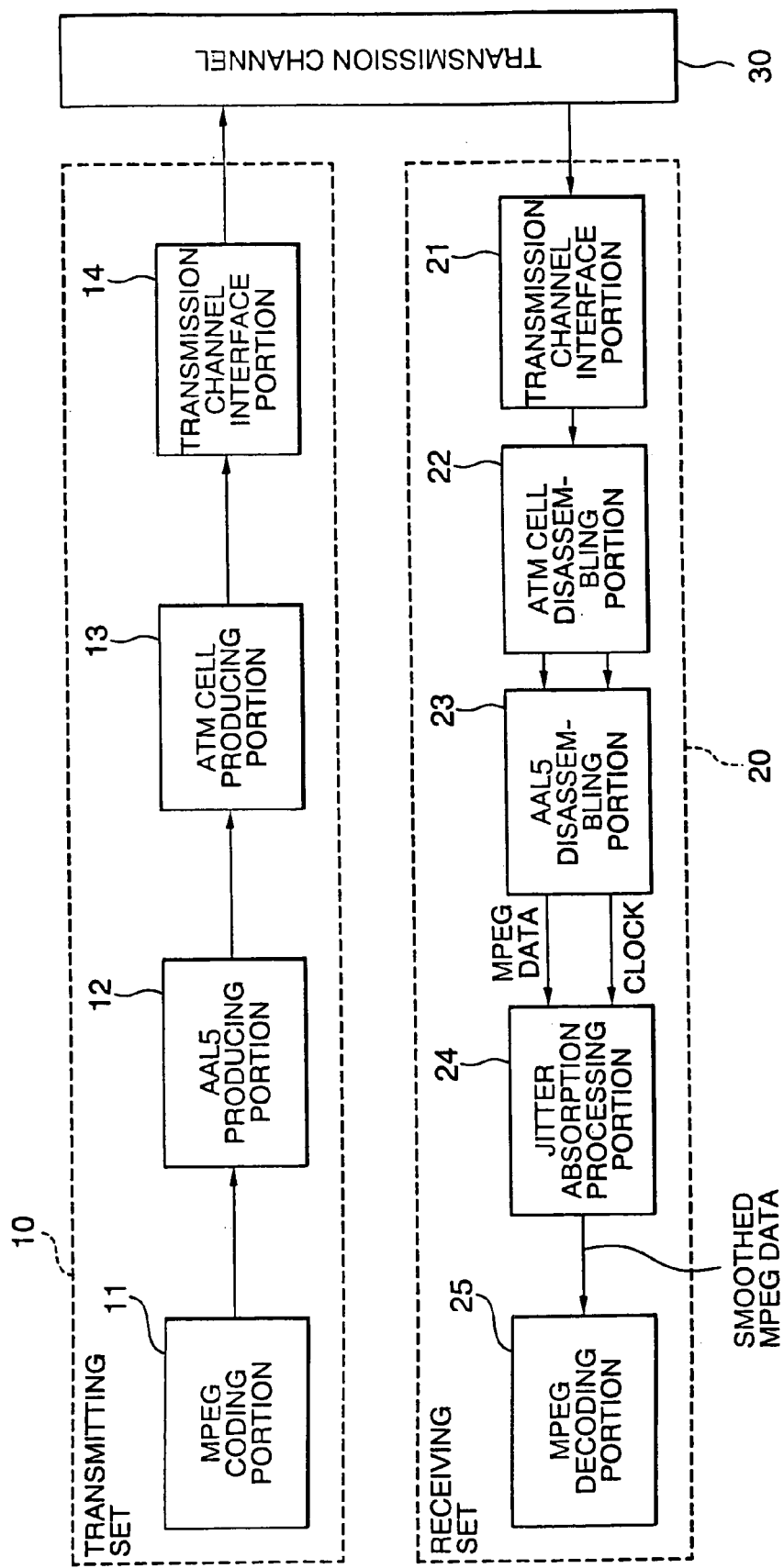
FIG. 1 is a block diagram showing a structure of a transmission system applied with a clock reproducing apparatus according to a first embodiment of this invention.

Referring to FIG. 1, description will be at first directed to a moving picture experts group (MPEG) coding/decoding system using a clock reproducing apparatus (or a receiving clock producing apparatus) according to a first embodiment of this invention.

The MPEG coding/decoding system comprises a transmitting set 10, a receiving set 20, and a transmission channel 30 connecting the transmitting set 10 with the receiving set 20. The transmission channel 30 is provided on a packet switching network or an asynchronous transfer mode (ATM) network.

The transmitting set 10 comprises an MPEG coding portion 11, an ATM adaptation layer 5 producing portion 12, an ATM cell producing portion 13, and a transmission channel interface portion 14. On the other hand, the receiving set 20 comprises a transmission channel interface portion 21, an ATM cell disassembling portion 22, an ATM adaptation layer 5 disassembling portion 23, a jitter absorption processing portion 24, and an MPEG decoding portion 25.

As well known in the art, a service signal based on MPEG-2 standards is not directly connected to an ATM layer, but connected to the ATM layer via an ATM adaptation layer. Five types (from AAL1 to ML5) are defined as the ATM adaptation layer. The AAL1, AAL2 and AAL5 can be used for multimedia service.

The AAL5 provides functions suitable for data communication, file transfer, or the like. Concretely, the AAL5 produces a transport stream (TS) packet having a length of 188 bytes which is four times as long as that of a substantial data of an ATM cell. Because the length of the TS packet is an integral multiple of that of the substantial data of the ATM cell, the TS packet is easily converted into the ATM cell. That is, the service signal based on MPEG-2 standards is efficiently connected with the ATM layer by the ATM adaptive layer. Additionally, the ATM cell has a total length of 53 bytes including 47 bytes for the substantial data.

An operation of the MPEG coding/decoding system of FIG. 1 will be described below.

In the transmitting set 10, the MPEG coding portion 11 encodes picture data (or a picture signal) into MPEG data. The AAL5 producing portion 12 produces TS packets from the MPEG data. Each of the TS packets has a fixed length of 188 bytes as mentioned above. The ATM cell producing portion 13 produces ATM cells from the TS packets. Each of the ATM cells has a fixed length of 53 bytes as mentioned above. The ATM cells are transmitted from the ATM cell producing portion 13 to the transmission channel interface 14 at a transmission speed of 6 Mbps. The transmission channel interface 14 transmits the ATM cells to the receiving set 20 through the transmission channel 30 at a transmission speed of 150 Mbps.

While the ATM cells are transmitted through the transmission channel 30, jitter occurs on the ATM cells. That is, a received signal (or ATM cells) received by the receiving set 20 has delay time variation or fluctuation.

In the receiving set 20, the transmission channel interface 21 receives the ATM cells from the transmission channel 30 and changes transmission speed of the received ATM cells from 150 Mbps to 6 Mbps. The ATM cell disassembling portion 22 disassembles the received ATM cells supplied at a transmitting speed of 6 Mbps into received TS packets. The AAL5 disassembling portion 23 disassembles the received TS packets into received MPEG data and a received transmitting clock.

As mentioned above, the jitter is given to the ATM cells in the transmission channel 30. That is, the received MPEG data and the received transmitting clock from the AAL 5 disassembling portion 23 has the transmission channel jitter. The transmission channel jitter must be absorbed or reduced to decode correctly the received MPEG data. The jitter absorption processing portion 24 is used to absorb the transmission channel jitter on the received MPEG data. That is, the jitter absorption processing portion 24 absorbs the transmission channel jitter on the received MPEG data to produce a smoothed MPEG data. The MPEG decoding portion 25 decodes the smoothed MPEG data to produce received picture data (or a received picture signal).

Figure 2:
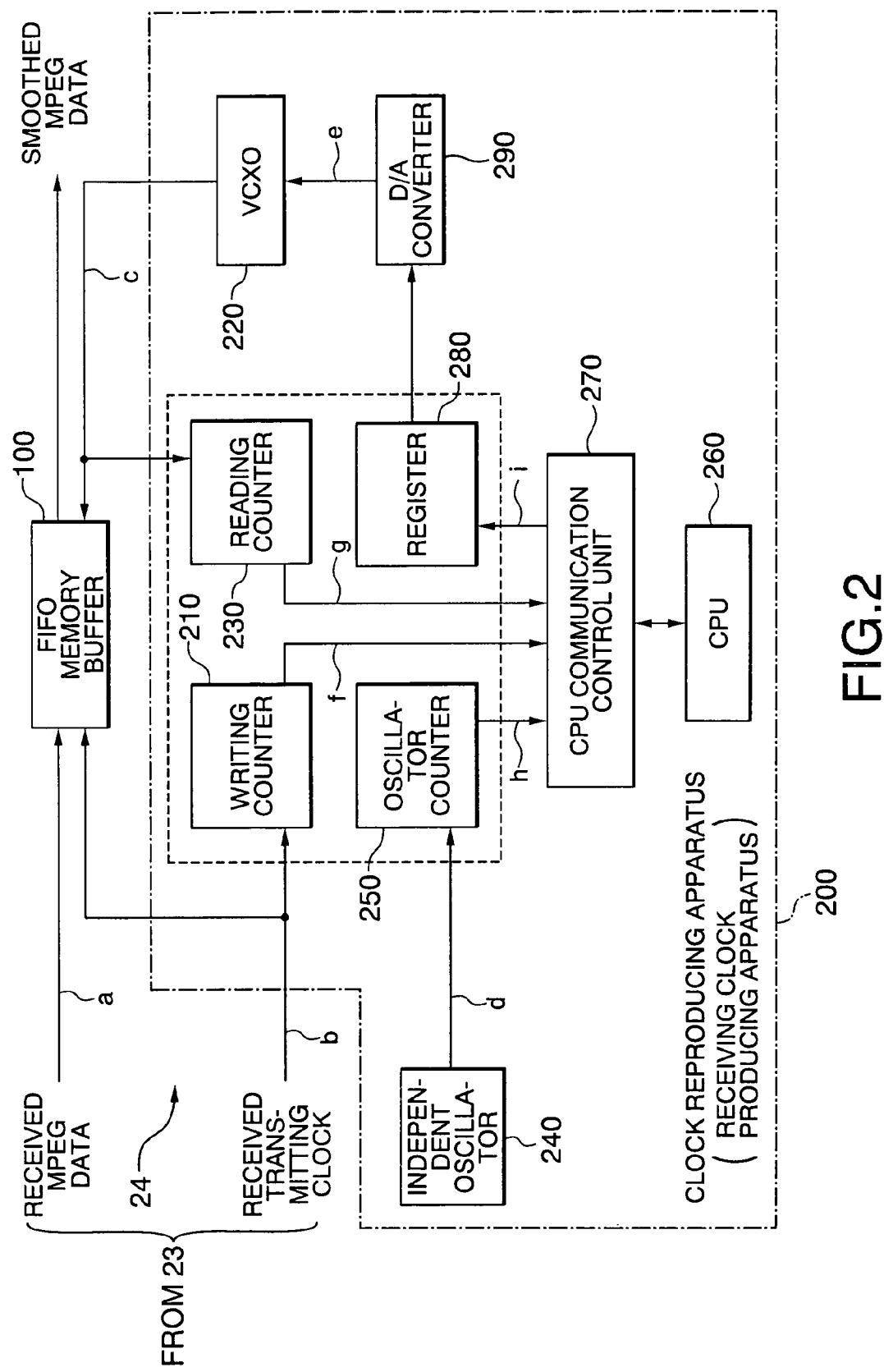
FIG. 2 is a block diagram showing a structure of a jitter absorption processing portion used in the transmission system of FIG. 1.

Referring to FIG. 2, the jitter absorption processing portion 24 is described in more detail.

The jitter absorption processing portion 24 comprises a first in first out (FIFO) memory buffer 100 and the clock reproducing apparatus 200 according to the first embodiment of this invention.

The clock reproducing apparatus 200 supplies a writing clock (or the received transmitting clock) to the FIFO memory buffer 100 to write the received MPEG data having the transmission channel jitter into the FIFO memory buffer 100 in synchronous with the writing clock. Furthermore, the clock reproducing apparatus 200 reproduces a receiving or reproduced clock (or a reading clock) which is used to read out the MPEG data from the FIFO memory buffer 100 as the smoothed MPEG data.

To carry out the above-mentioned operation, the clock reproducing apparatus 200 comprises a writing counter 210, a voltage controlled crystal oscillator (VCXO) 220, a reading counter 230, an independent oscillator 240, an oscillator counter 250, a central processing unit (CPU) 260, a CPU communication control unit 270, a register 280, and a digital-to-analog (DIA) converter 290. The CPU 260 forms a controller of the clock reproducing apparatus 200 together with the CPU communication control unit 270, the register 280 and the D/A converter 290.

An operation of the clock reproducing apparatus 200 will be roughly described in the following.

The received MPEG data "a" having the transmission channel jitter is supplied from the AAL5 disassembling portion 23 to the FIFO memory buffer 100. On the other hand, the received transmitting clock "b" is supplied from the AAL5 disassembling portion 23 to the clock reproducing apparatus 200. The clock reproducing apparatus 200 divides the received transmitting clock "b" into two and supplies one of them to the FIFO memory buffer 100 as a writing clock. Thus, the received MPEG data "a" having the transmission channel jitter is written in the FIFO memory buffer 100 in synchronous with the received transmitting clock "b".

The other of the divided transmitting clock "b" is supplied to the writing counter 210. The writing counter 210 counts pulses of the divided transmitting clock "b" to produce a counted writing value "f" representing the number of the pulses of the divided transmitting clock "b".

When amount of the MPEG data "a" stored in the FIFO memory buffer 100 reaches a predetermined volume "target", the clock reproducing apparatus 200 produces the receiving clock "c" with an initial repetition frequency. The receiving clock "c" is divided into two and one of them is supplied to the FIFO memory buffer 100 as a reading clock.

The other of the divided receiving clock "c" is supplied to the reading counter 230. The reading counter 230 counts pulses of the divided receiving clock "c" to produce a counted reading value "g" representative of the number of the pulses of the divided receiving clock "c".

On the other hand, the independent oscillator 240 produces an independent clock "d" with a fixed repetition frequency. The oscillator counter 250 counts pulses of the independent clock "d" to produce a counted reference value "h" representing the number of the pulses of the independent clock "d".

The counted writing value "f", the counted reading value "g" and the counted reference value "h" are notified to the CPU 260 through the CPU communication control unit 270.

The CPU 260 produces a digital voltage control signal "i" for controlling the VCXO 220 on the basis of the counted writing value "f", the counted reading value "g" and the counted reference value "h". Then, the CPU 260 supplies the digital voltage control signal "i" to the register 280 through the CPU communication control unit 270.

The register 280 holds the digital voltage control signal "i" to supply it to the D/A converter 290. The DIA converter 290 converts the digital voltage control signal held by the register 280 into an analog voltage control signal "e".

The VCXO 220 changes a repetition frequency of the receiving clock according to the analog voltage control signal supplied from the D/A converter 290.

Next, the operation of the clocking reproducing apparatus will be described in more detail.

The MPEG data "a" has a frame structure. One TS frame of the MPEG data "a" corresponds to two TS packets. Eight ATM cells are used to transmit two TS packets from the transmitting set 10 to the receiving set 20. As mentioned above, each TS packet has the fixed length of 188 bytes white each ATM cell has the length of 53 bytes.

The CPU 260 takes the counted reading value "g" and the counted reference value "h" from the reading counter 230 and the oscillator counter 250, respectively, for every updating period decided by the counted writing value "f". The updating period corresponds to a predetermined number "th1" of the TS frames (e.g. 1024 frames) of the MPEG data "a" supplied from the AAL5 disassembling portion 23. That is, the CPU 260 detects the updating period on the basis of the counted writing value "f" supplied from the writing counter 210. The CPU 260 produces the digital voltage control signal "i" as mentioned after in more detail when it takes the counted reading value "g" and the counted reference value "h".

Here, increment of the counted writing value "f", the counted reading value "g" and the counted reference value "h" for each updating period are defined as "delta_write", "delta_read" and "delta_0", respectively.

The CPU 260 estimates occurrence amount of the transmission channel jitter by using the increment "delta_0" to produce the digital voltage control signal "i" in consideration of the transmission channel jitter. That is, the estimated occurrence amount of the jitter influences the receiving clock and thereby influences the counted reading value "g". Here, estimated deviation caused by the estimated occurrence amount of the jitter in the counted reading value "g" is defined as "e_count". The CPU calculates a phase comparison function "ni" representing phase relation obtained between the writing clock "b" and the reading clock "c" in a case where it is assumed that there is not the transmission channel jitter. The phase comparison function "ni" is given by:

$$ni = \text{delta\_write} - (\text{delta\_read} - \text{e\_count})$$
$$= \text{delta\_0} - \text{delta\_read}.$$

The phase comparison function "ni" corresponds to an estimated value of delay time variation of the received MPEG data "a" caused by the transmission channel jitter. A calculated result of the phase comparison function "ni" is used to reduce or absorb influence of the transmission channel jitter on the digital voltage control signal "i". That is, the CPU 260 produces the digital voltage control signal "i" given by a function "cont" as mentioned below.

$$cont = ni + \text{diff} \times \alpha$$
$$= \text{delta\_0} - \text{delta\_read} + \text{diff} \times \alpha$$

where "α" represents a weight coefficient while "diff" represents a value which is in proportion to a difference between an amount of the received MPEG data staying in the FIFO memory buffer 100 and the predetermined value "target". That is, "diff" represents a control value used for feed back control to prevent the FIFO memory buffer 100 overflowing. In a case where the FIFO memory buffer 100 has the memory volume of 20 Kbytes, the predetermined value is, for example, set at 10 Kbytes.

Figure 3:
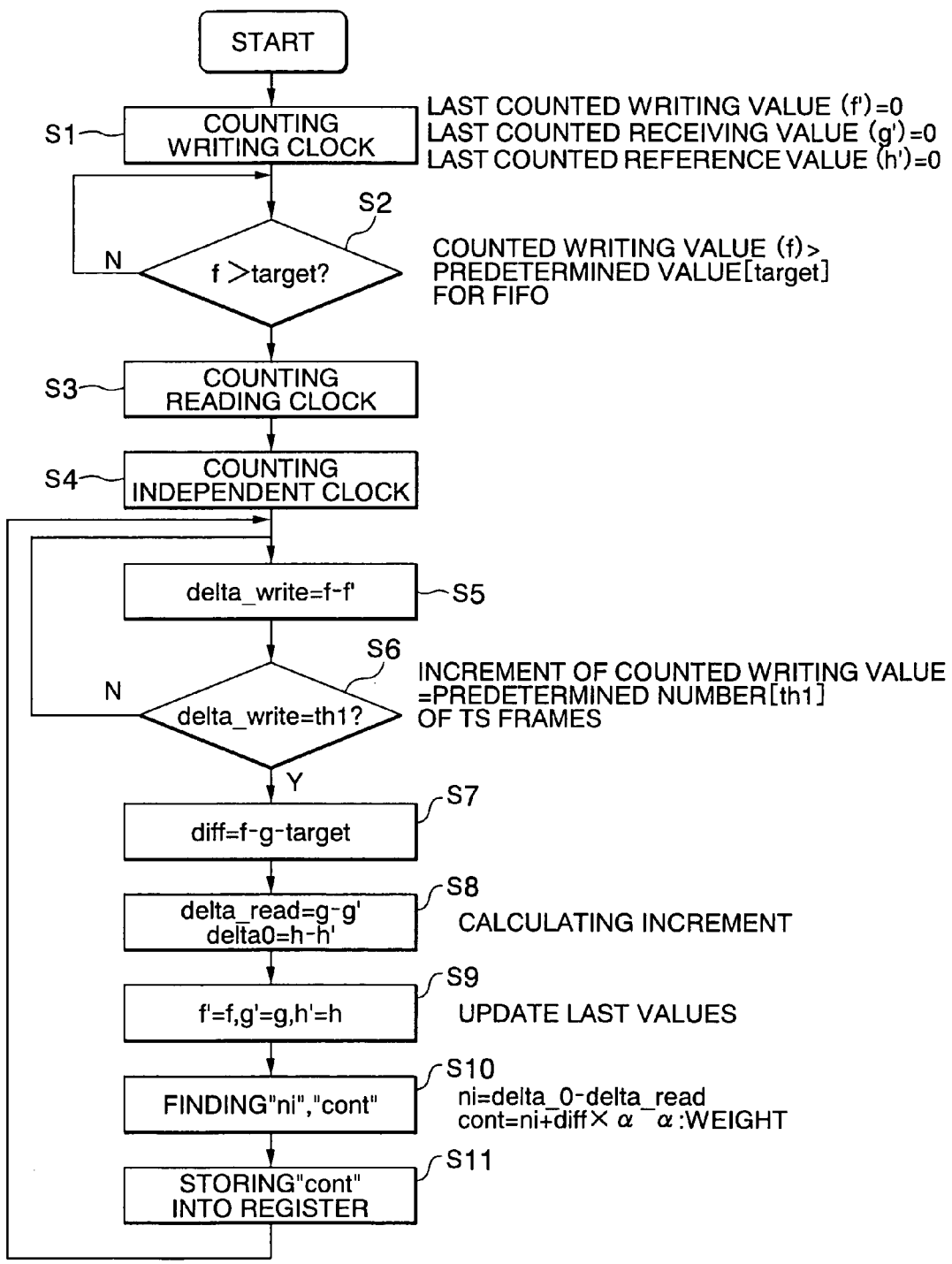
FIG. 3 is a flowchart for describing an operation of a CPU of the clock reproducing apparatus included in the jitter absorption processing portion of FIG. 2.

Referring to FIG. 3 together with FIG. 2, the operation of the CPU 260 will be described in more detail.

At first, the CPU 260 sets the last counted writing value "f", the last counted reading value "g" and the last counted reference value "h" at an initial value of "0 (zero)". The values of "f", "g" and "h" are stored in a memory (not shown) connected by the CPU 260. The memory further memorizes an initial digital voltage control signal "i".

While the writing counter 210 counts the pulses of the received transmitting clock "b", the CPU 260 receives the counted writing value "f" through the CPU communication control unit 270 (Step S1). The CPU 260 judges whether the counted writing value "f" is larger than the predetermined value "target" or not (Step S2).

If the counted writing value "f" is larger than the predetermined value "target", the CPU 260 writes the initial digital voltage control signal "i" into the register 280 through the CPU communication control unit 270. Simultaneously, the CPU 260 makes the independent oscillator 240 start producing the independent clock "d".

The D/A converter 290 converts the digital voltage control signal "i" held by the register 280 into the analog voltage control signal "e". The analog voltage control signal "e" is supplied from the D/A converter 290 to the VCXO 220. The VCXO 220 starts to produce the receiving clock "c" in response to the analog voltage control signal "e" to start reading the received MPEG data from FIFO memory buffer 100.

Upon receiving the receiving clock "c", the reading counter 230 starts counting pulses of the receiving clock "c" (Step S3). The counted reading value "g" is sent from the reading counter 230 to the CPU 260 via the CPU communication control unit 270.

On the other hand, the oscillator counter 250 counts the pulses of the independent clock "d" produced by the independent oscillator 240 and supplies the counted reference value "h" to the CPU 260 via the communication control unit 270 (Step S4).

Thus, the CPU 260 receives the counted writing value "f", the counted reading value "g" and the counted reference value "h".

Next, the CPU 260 subtracts the last counted writing value "f" from the counted writing value "f" to find the increment "delta_write" (Step 5). That is, the CPU 260 calculates "f—f". Then, the CPU 260 judges whether the increment "delta_write" is equal to the predetermined number "th1" of the TS frames or not (Step S6).

When the increment "delta_write" is equal to the predetermined number "th1", the CPU holds the values "f", "g" and "h". Then, the CPU 260 subtracts the held value "g" and the predetermined value "target" from the held value "f" to find the control value "diff" (Step S7). That is, the CPU 260 calculates "f–g-target". Furthermore, the CPU 260 subtracts the last counted reading value "g" from the held value "g" to find the increment "delta_read" and subtracts the last counted reference value "h" from the held value "h" to find the increment "delta_0" (Step S8). That is, the CPU 260 calculates "g—g" and "h—h". In addition, the CPU 260 replaces the last counted writing, reading and reference values "f", "g" and "h" with the held values "f", "g" and "h", respectively (Step S9).

Next, the CPU 260 subtracts the increment "delta_read" of the counted reading value "g" from the inclement "delta_0" of the counted reference value "h" to find the phase comparison function "ni". The CPU 260 adds the value of the phase comparison function "ni" to the product of the control value "diff" by the weight coefficient α to find the digital voltage control signal "cont" (Step S10). That is, the CPU 260 calculates "ni+diff×α" after calculation of "delta_0-delta_read".

Finally, the CPU 260 stores the digital voltage control signal "cont" into the register 280 through the CPU communication control unit 270 (Step S11).

Subsequently, the CPU 260 repeatedly executes the steps S5 to S11.

Though the jitter absorption processing portion 24 provides the FIFO memory buffer, the clock reproducing apparatus 200 may combine with another type buffer memory.

Figure 4:
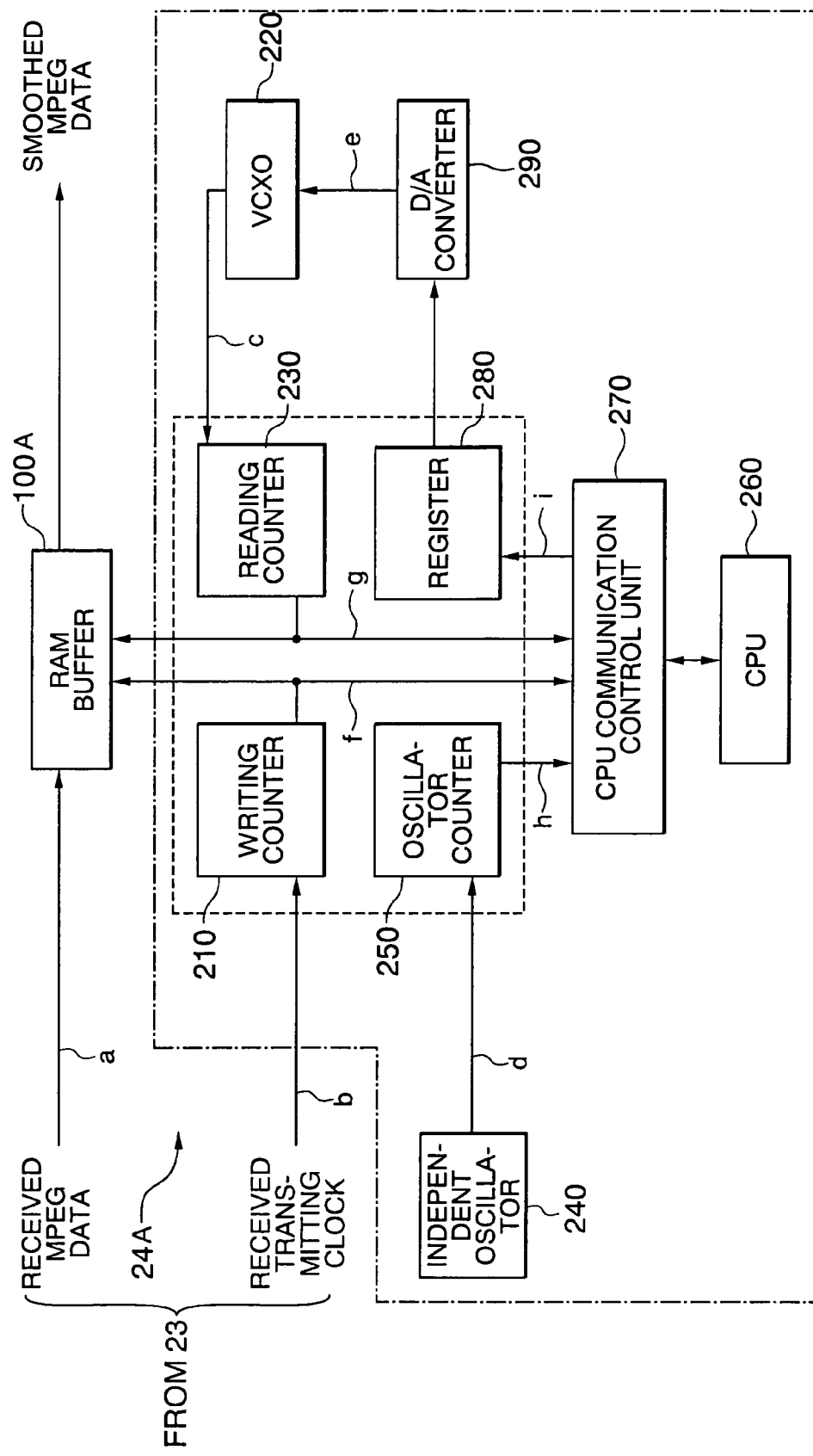
FIG. 4 is a block diagram showing a structure of a jitter absorption processing portion including a clock reproducing apparatus according to a second embodiment of this invention.

Referring to FIG. 4, the description will be made as regards a clock reproducing apparatus 200A according to a second embodiment of this invention.

The clock reproducing apparatus 200A is combined with a random access memory (RAM) buffer 100A to constitute the jitter absorption processing portion 24. The RAM buffer 100A may comprises a dual port synchronies random access memory (SRAM). The clock reproducing apparatus 200A supplies the counted writing value "f" and the counted reading value "g" instead of the received transmitting clock "b" and the receiving clock "c" to the RAM buffer 100A. The counted writing value "f" and the counted writing value "g" are used as a writing address and a reading address for the RAM buffer 100A.

The clock reproducing apparatus 200A operates just like that of the first embodiment.

Figure 5:
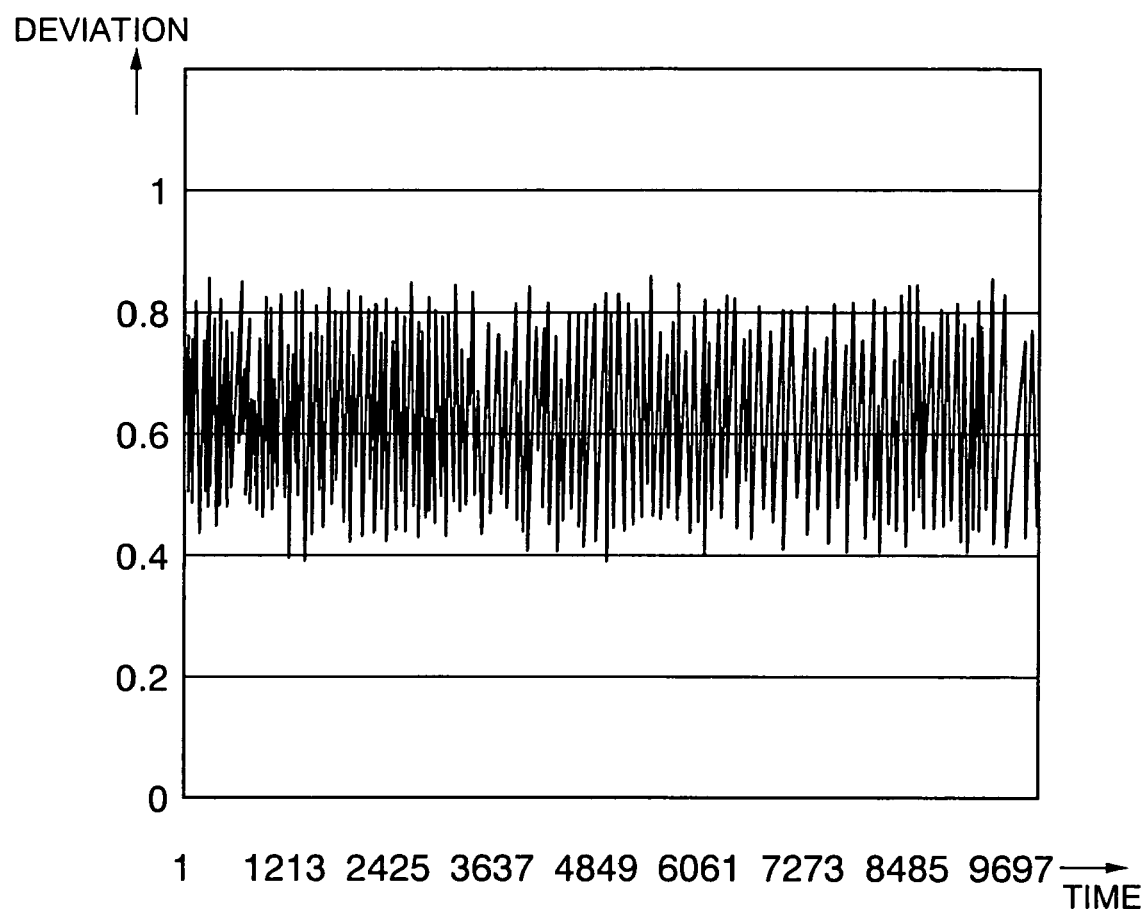
FIG. 5 is a graph showing simulation result obtained by using a related clock reproducing method for a received signal with jitter of 0.01 msec at the maximum.
Figure 6:
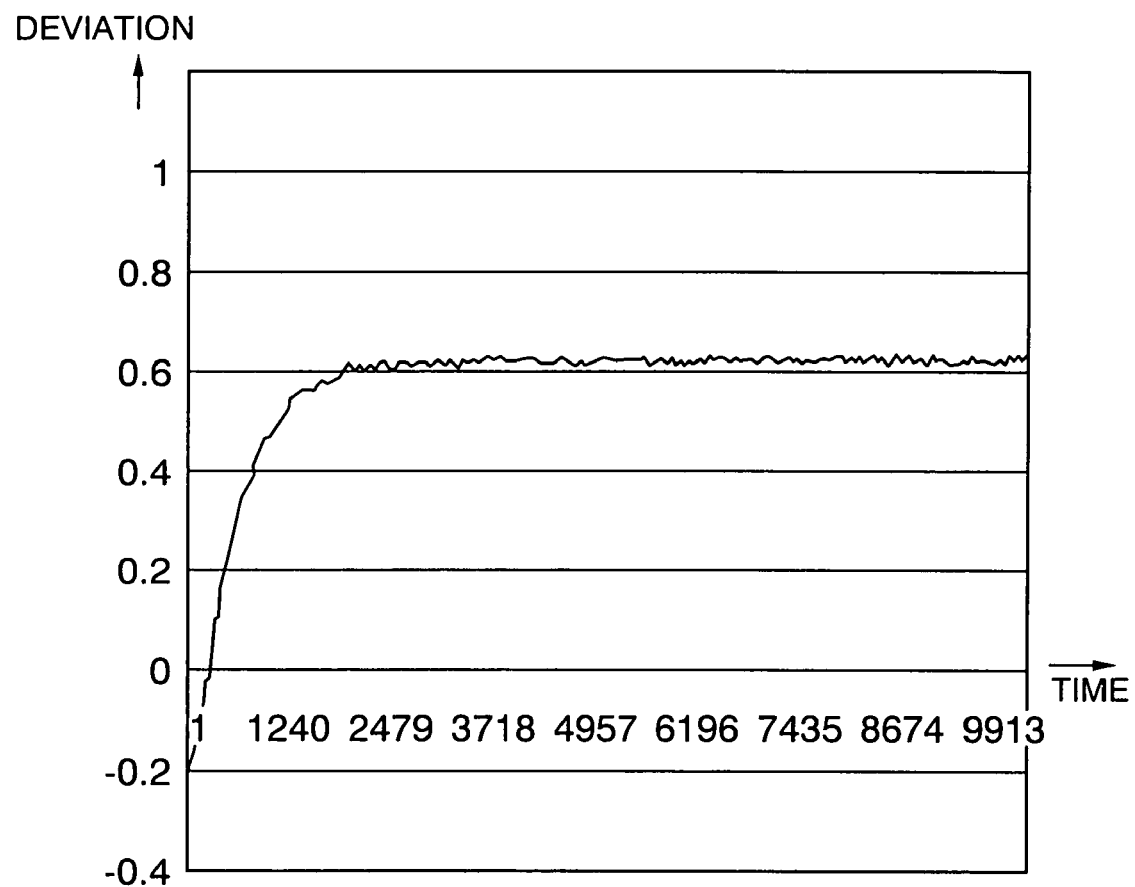
FIG. 6 is a graph of simulation result obtained by using a clock reproducing method of this invention for a received signal with jitter of 1.5 msec at the maximum.
Figure 7:
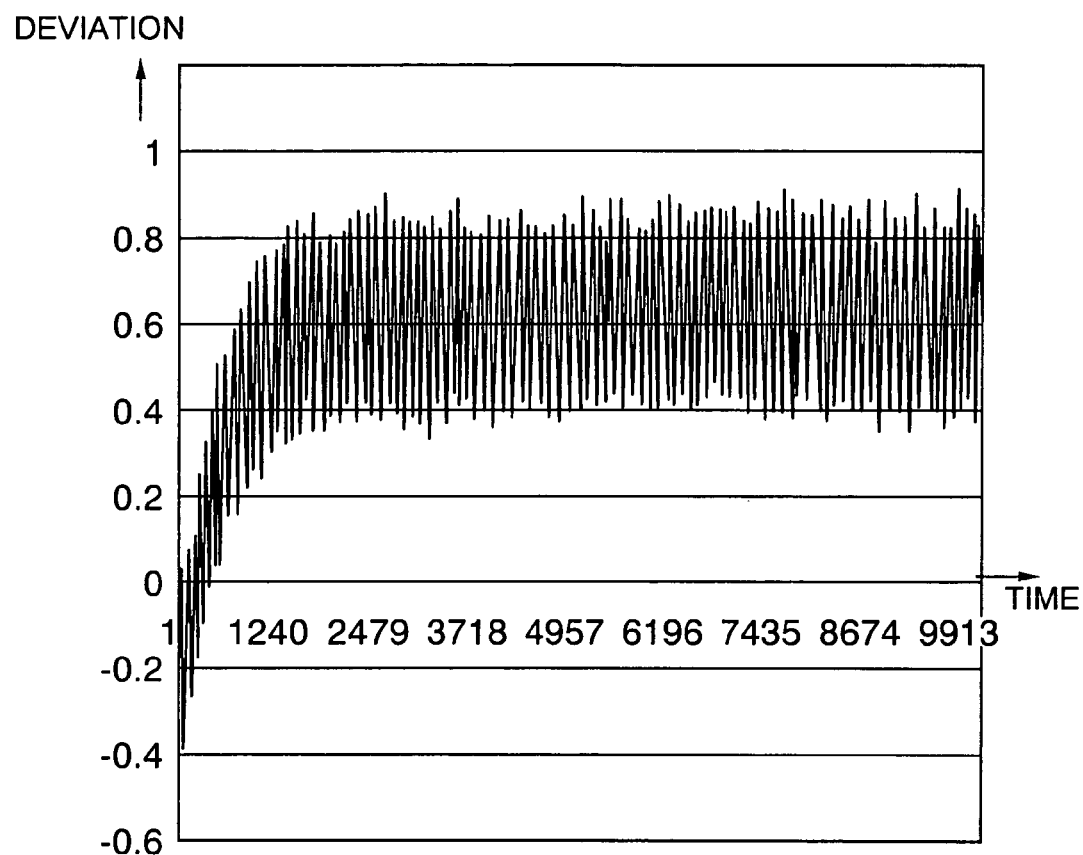
FIG. 7 is a graph of simulation result obtained by using the clock reproducing method of this invention for a received signal with jitter of 10 msec at the maximum.

FIGS. 5 to 7 are graphs showing the simulation results obtained by computer simulation to make quantitative effects of this invention clear. Each graph has the horizontal axis corresponding to time and the vertical axis corresponding to deviation of the received MPEG data. The numerical values depicted along the horizontal axis represents the number of times the CPU 260 produces the digital voltage control signal "cont" (or "cont"). On the other hand, as regards the vertical axis, a value of "1" equal to 50 ppm.

FIG. 5 shows the simulation result obtained by the use of related clock reproducing method. This method does not take the estimated deviation "e_count", which is caused by the estimated occurrence amount of the jitter in the counted reading value "g", into consideration. With this method, the digital voltage control signal "cont" are given by:

cont'=delta_write−delta_read+diff×α.

As shown in FIG. 5, the MPEG data read from the buffer memory has deviation of 20 ppm in a case where the received MPEG data has the transmission jitter of 0.01 msec at the maximum. That is, the receiving clock reproduced by using the related clock reproducing method has the deviation of 20 ppm when received signal has the jitter of 0.01 msec at the maximum.

On the other hand, FIG. 6 and 7 show the simulation results obtained by using the clock reproducing method of this invention.

FIG. 6 shows that the MPEG data read out from the buffer memory has slightly deviation of 2 ppm in a case where the received signal has the transmission jitter of 1.5 msec. FIG. 7 shows that the MPEG data read out from the buffer memory has deviation of 30 ppm even if the received signal has the transmission jitter of 10 msec.

As easily understood from FIGS. 5 to 7, the clock reproducing method of this invention can considerably reduce or absorb the transmission channel jitter in comparison with that of the related clock reproducing method.

While this invention has thus far been described in conjunction with the preferred embodiments thereof, it will readily be possible for those skilled in the art to put this invention into practice in various other manners. For example, this invention may be applied to a common packet switching network including an Internet protocol network. Furthermore, this invention may be applied to a packet switching network for transmitting packets having variable length. In this case, the AAL5 disassembling portion 23 detects the length of each received data packet to notify the jitter absorption processing portion 24 of the length of the received data packet. The clock reproducing apparatus 200 of the jitter absorption processing portion 23 changes the number "th1" of the TS frames in response to the notification of the length of the received data packet.

What is claimed is:

1. A receiving clock reproducing method for reproducing a receiving clock without synchronizing said receiving clock with a transmitting clock included in a received signal, said receiving clock reproducing method comprising the steps of:

finding an estimated value of delay time fluctuations of said received signal utilizing an oscillator independent of said transmitting clock at intervals defined by said transmitting clock; and controlling a voltage controlled oscillator according to said estimated value to reproduce said receiving clock.

2. A receiving clock reproducing method for reproducing a receiving clock without synchronizing said receiving clock with a transmitting clock included in a received signal, said receiving clock reproducing method comprising the steps of:

finding an estimated value of delay time fluctuation of said received signal at intervals defined by said transmitting clock, said finding step comprising the steps of:

counting, with a writing counter, pulses of said transmitting clock to produce a counted writing value used for defining said intervals;

counting, with a reading counter, pulses of said receiving clock to produce a counted reading value;

counting, with an oscillator counter, pulses of a reference clock generated by an independent oscillator to produce a counted reference value; and calculating said estimated value by using said counted writing value, said counted reading value, and said counted reference value; and controlling a voltage controlled oscillator according to said estimated value to reproduce said receiving clock.

3. A receiving clock reproducing apparatus for reproducing a receiving clock to read data from a buffer memory, said data taken from a received signal and written in said buffer memory in synchronization with a transmitting clock included in said received signal, said receiving clock reproducing apparatus comprising:

a writing counter for counting pulses of said transmitting clock to produce a counted writing value;

a voltage controlled oscillator for producing said receiving clock according to an oscillator control signal;

a reading counter connected to said voltage controlled oscillator for counting pulses of said receiving clock to produce a counted reading value;

an independent oscillator for producing a reference clock;

an oscillator counter connected to said independent oscillator for counting pulses of said reference clock to produce a counted reference value; and a controller connected to said writing counter, said reading counter and said oscillator counter for producing said oscillator control signal on the basis of said counted writing value, said counted reading value and said counted reference value.

4. A receiving clock reproducing apparatus as claimed in claim 3, wherein said controller comprises:

a central processing unit for producing a digital voltage control signal on the basis of said counted writing value, said counted reading value and said counted reference value;

a register for holding said digital voltage control signal;

a CPU communication control unit connected to said writing counter, said reading counter, said oscillator counter and said register for transmitting said counted writing value, said counted reading value and said counted reference value to said central processing unit and for transmitting said digital voltage control signal to said register; and a digital-to-analog converter connected between said register and said voltage controlled oscillator for converting said digital voltage control signal into an analog voltage control signal to supply said analog voltage control signal for said voltage controlled oscillator as said oscillator control signal.

5. A receiving clock reproducing apparatus for reproducing a receiving clock to read MPEG data from a buffer memoly, said MPEG data transmitted via a packet switching network together with a transmitting clock in the form of packets and written in said buffer memory in synchronous with said transmitting clock, said receiving clock reproducing apparatus comprising:

a writing counter for counting pulses of said transmitting clock to produce a counted writing value;

a voltage controlled crystal oscillator for starting to produce said receiving clock after an amount of said MPEG data stored in said buffer memory reaches a predetermined value;

a reading counter for counting pulses of said receiving clock to produce a counted reading value;

an oscillator counter for counting pulses of a reference clock supplied from an independent oscillator provided at a receiving side of said packet switching network to produce a counted reference value;

a calculating portion for producing a digital voltage control signal used for controlling said voltage controlled crystal oscillator on the basis of said counted writing value, said counted reading value and said counted reference value; and a digital-to-analog converter for converting said digital voltage control signal into an analog voltage control signal to supply said analog voltage control signal to said voltage controlled crystal oscillator.

6. A receiving clock reproducing apparatus as claimed in claim 5, wherein said calculating portion comprises:

a central processing unit for producing said digital voltage control signal used for controlling said voltage controlled crystal oscillator on the basis of said counted writing value, said counted reading value and said counted reference value;

a CPU communication controller for transmitting said counted writing value, said counted reading value and counted reference value to said central processing unit; and a register for holding said digital voltage control signal supplied through said CPU communication controller;

wherein said digital voltage control signal held by said register is supplied to said digital-to-analog converter.

7. A receiving clock reproducing apparatus as claimed in claim 5, wherein said packet switching network comprises an asynchronous transfer mode network.

8. A receiving clock reproducing apparatus as claimed in claim 5, wherein said packet switching network comprises an Internet protocol network.

* * * * *